(12) United States Patent
Sasaoka et al.

(10) Patent No.: US 6,574,404 B2
(45) Date of Patent: Jun. 3, 2003

(54) CHOROMATIC DISPERSION COMPENSATING MODULE AND OPTICAL TRANSMISSION SYSTEM USING THE SAME

(75) Inventors: Eisuke Sasaoka, Yokohama (JP); Masao Tsukitani, Yokohama (JP); Shigeru Tanaka, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/771,937

(22) Filed: Jan. 30, 2001

(65) Prior Publication Data

US 2001/0048798 A1 Dec. 6, 2001

Related U.S. Application Data

(60) Provisional application No. 60/234,180, filed on Sep. 20, 2000.

(30) Foreign Application Priority Data

Jan. 31, 2000 (JP) ........................................ 2000-022446

(51) Int. Cl.[7] .................................................. G02B 6/16
(52) U.S. Cl. ........................... 385/123; 385/15; 359/161
(58) Field of Search ................................. 385/123, 100, 385/15; 359/161, 173, 179, 188, 195

(56) References Cited

U.S. PATENT DOCUMENTS

| 5,530,581 A | 6/1996 | Cogan |
| 5,793,917 A | 8/1998 | Yoshimura |
| 2001/0024306 A1 * | 9/2001 | Okuno ........................ 359/161 |

FOREIGN PATENT DOCUMENTS

| EP | 902558 A2 | 3/1999 |
| JP | 8-256106 | 10/1996 |
| JP | 9-23187 | 1/1997 |
| JP | 11-88260 | 3/1999 |

OTHER PUBLICATIONS

Shoichiro Kuwahara, et al., "Adaptative dispersion equalization with the detection of dispersion fluctuation using PM–AM conversion", NTT Optical Network System Laboratories, p. 417.

H. Ooi, et al., "Automatic dispersion equalization experiment using tunable laser in 40–Gbits/s transmission", Fujitsu Laboratories, Ltd., p. 418.

\* cited by examiner

*Primary Examiner*—Rodney Bovernick
*Assistant Examiner*—Sung Pak
(74) *Attorney, Agent, or Firm*—McDermott, Will & Emery

(57) ABSTRACT

The present invention is related to a chromatic dispersion compensating module which realizes signal transmission at a high bit rate by its simple constitution, and an optical transmission system comprising the same. The chromatic dispersion compensating module according to the present invention comprises a chromatic dispersion compensator which compensates for the chromatic dispersion of an optical fiber transmission line at a predetermined wavelength, and a temperature controller which controls the temperature of the chromatic dispersion compensator in such a manner to set the chromatic dispersion of the chromatic dispersion compensator at a desired value. By this constitution, the dispersion compensation control in correspondence with the chromatic dispersion fluctuation in the optical fiber transmission line caused by the temperature fluctuation and the like is made possible. Hence, the cumulative chromatic dispersion as viewed from the entire optical fiber transmission line can be effectively reduced by its simple constitution.

18 Claims, 8 Drawing Sheets

FROM 35

CHOROMATIC DISPERSION COMPENSATING MODULE AND OPTICAL TRANSMISSION SYSTEM USING THE SAME

CROSS-REFERENCE TO RELATED APPLICATION

This application claims priority to Provisional Application Ser. No. 60/234,180 filed Sep. 20, 2000 which is/are hereby incorporated by reference in its/their entirety.

BACKGROUND OF THE INVENTION

1. Field of the Invention

The present invention relates to a chromatic dispersion compensating module which compensates the chromatic dispersion of an optical fiber transmission line, and an optical transmission system using the same.

2. Related Background Art

Optical communication using an optical fiber transmission line enables a high-speed and large-capacity information transmission. The bit rate in optical transmission is increasing from 10 Gb/s to 20 Gb/s, and furthermore, to 40 Gb/s. In such a high-speed optical transmission, the waveform degradation of each signal caused by the chromatic dispersion intrinsic to the optical fiber transmission line is found problematic. More specifically, with increasing bit rate, a further minimized absolute value of cumulative chromatic dispersion is required for the optical fiber transmission line set between the transmitting end and the receiving end through which the signals propagate. Accordingly, there is employed a dispersion-shifted optical fiber having a zero-dispersion wavelength in a signal wavelength band (i.e., the 1.55 $\mu$m wavelength band) as the optical fiber transmission line which enables a signal transmission with small waveform degradation at a high bit rate.

However, the optical fiber transmission line is generally installed on land or undersea, i.e., under natural environments. Thus, the absolute value of chromatic dispersion is subject to natural conditions, and may be varied due to factors such as the diurnal or seasonal temperature fluctuation. In such a case, even if the dispersion-shifted optical fiber should be employed for the optical fiber transmission line, the waveform degradation of each signal propagating through the optical fiber transmission line is not negligible, and there may occur cases in which a signal transmission at a high bit rate is unfeasible.

As a technology for overcoming the above-mentioned problem is disclosed, for example, in document 1, Kuwahara et al., "Study on optimized dispersion equalizing method by detecting dispersion fluctuation using PM-AM conversion effect", Proc. of Electronic Information Communication Society, 1998, B-10-95 (1998), or in document 2, Ooi et al., "Automatic dispersion equalizing experiment on 40 Gbit/s transmission using wavelength variable lasers", Proc. of Electronic Information Communication Society, 1998, B-10-96 (1998).

In the technology disclosed in the documents 1 and 2, the light (signals) reached to the receiving end of the optical fiber transmission line is monitored to measure the cumulative chromatic dispersion or the change in cumulative chromatic dispersion of the optical fiber transmission line. The wavelength of each output signal is then controlled on the transmitting end based on the thus acknowledged measured results. More specifically, the wavelength of each signal outputted from the transmitting end is controlled in such a manner that the measured cumulative chromatic dispersion of the optical fiber transmission line should be minimized at the receiving end. In this manner, signals having a wavelength in the vicinity of zero-dispersion wavelength constantly propagate through the optical fiber transmission line. As a result, the waveform degradation of each signal is suppressed to enable a signal transmission of high bit rate.

SUMMARY OF THE INVENTION

The present inventors studied the above-mentioned prior art technology, and have found problems as follows. That is, in the constitution of the technology disclosed in the documents 1 and 2, the measurement results of the cumulative chromatic dispersion of the optical fiber transmission line are acknowledged to the transmitting end. This implies that the constitution further requires additional communication means and signal transmission lines. Furthermore, to control the wavelengths of the signals emitted from the transmitting end in accordance with the acknowledged results, there must be provided a light source with wavelength changeable function. Thus, the technology disclosed in the documents 1 and 2 inevitably requires an optical transmission system with a complicated constitution.

The present invention has been made with an aim to overcome the aforementioned problems. Thus, an object of the present invention is to provide a chromatic dispersion compensating module having its simple constitution, and yet capable of realizing a signal transmission of high bit rate by compensating for the chromatic dispersion of the optical fiber transmission line, and to provide an optical transmission system using the same.

The optical transmission system according to the present invention is applicable to WDM (Wavelength Division Multiplexing) communication using signals having a plurality of wavelengths propagating through one or more optical fiber transmission lines. The optical fiber transmission lines can be provided at least between the transmitter and the receiver, between the transmitter and a repeater, between repeaters, or between a repeater and the receiver.

The chromatic dispersion compensating module according to the present invention, which is applicable to the optical transmission system, has a function of compensating for the chromatic dispersion of the optical fiber transmission line, and comprises at least a chromatic dispersion compensator and a temperature controller. The chromatic dispersion compensator has, at a predetermined wavelength, a chromatic dispersion with a sign opposite to that of the optical fiber transmission line that is the object to be compensated, and a chromatic dispersion slope with a sign opposite to that of the optical fiber transmission line. The temperature controller sets the chromatic dispersion of the chromatic dispersion compensator at a desired value by controlling the temperature of the chromatic dispersion compensator.

In accordance with a chromatic dispersion compensating module having the above-mentioned structure, at a predetermined wavelength of, for example, 1550 nm, the cumulative chromatic dispersion as viewed from the entire optical transmission system can be effectively reduced because the signs of the chromatic dispersion of the optical fiber transmission line and the chromatic dispersion compensator are set opposite to each other. In case the optical transmission system is constructed from a plurality of optical fiber transmission lines via one or more repeaters, it is preferable that the chromatic dispersion compensator is prepared to each of the optical fiber transmission lines (such that the chromatic dispersion compensators are each set on the repeaters and the receiver). Furthermore, since the signs of the chromatic dispersion slopes of the optical fiber transmission line and the chromatic dispersion compensator are set opposite to each other, the cumulative chromatic dispersion as viewed from the entire optical transmission system for each of signals having a plurality of wavelengths can be effectively reduced over a wavelength broader band. In addition, even if the chromatic dispersion of the optical fiber transmission line should change attributed to a temperature fluctuation and the like, the temperature of the chromatic dispersion compensator is controlled by the temperature controller. Accordingly, in this case again, the cumulative chromatic dispersion as viewed from the entire optical transmission system can be effectively reduced.

Further, in the chromatic dispersion compensating module according to the present invention, the chromatic dispersion compensator preferably includes a dispersion compensating optical fiber. The dispersion compensating optical fiber constitutes a part of the transmission line of the optical transmission system, and it minimizes the insertion loss. Moreover, in the chromatic dispersion compensating module according to the present invention, at a predetermined wavelength, the absolute value of the temperature dependence in the chromatic dispersion of the dispersion compensating optical fiber, i.e., the absolute value in the amount of chromatic dispersion fluctuation per unit temperature, is preferably larger than the absolute value of chromatic dispersion fluctuation per unit temperature for the optical fiber transmission line. Otherwise, at a predetermined wavelength, the absolute value of temperature dependence in chromatic dispersion for the dispersion compensating optical fiber is preferably 0.002 ps/nm/km/° C. or higher. In either cases, an efficient chromatic dispersion compensation is possible because the temperature of the dispersion compensating optical fiber is properly controlled.

The chromatic dispersion compensating module according to the present invention, furthermore, may comprise additionally a chromatic dispersion controlling unit which controls the temperature controller (i.e., for temperature control of the chromatic dispersion compensator), to thereby control the chromatic dispersion of the chromatic dispersion compensator. By thus providing the chromatic dispersion controlling unit, the temperature control, which is performed by the temperature controller, of the chromatic dispersion compensator is performed to control the chromatic dispersion of the chromatic dispersion compensator in such a manner that the cumulative chromatic dispersion as viewed from the entire section to be compensated by the chromatic dispersion compensator, the section including the optical fiber transmission line and the chromatic dispersion compensator, can be maintained substantially zero.

The chromatic dispersion compensating module according to the present invention may further comprise, in addition to the chromatic dispersion controlling unit which controls the temperature controller, a chromatic dispersion measuring unit which measures the cumulative chromatic dispersion or the change in cumulative chromatic dispersion of the optical fiber transmission line by monitoring light inputted into the chromatic dispersion compensator. In this case, a feed-forward control is applied to the chromatic dispersion of the chromatic dispersion compensator in such a manner that the cumulative chromatic dispersion as viewed from the entire section to be compensated by the chromatic dispersion compensator, the section including the optical fiber transmission line and the chromatic dispersion compensator, is maintained substantially zero.

Furthermore, the chromatic dispersion compensating module according to the present invention may comprise, in addition to the chromatic dispersion controlling unit which controls the temperature controller, a chromatic dispersion measuring unit which monitors the signal output from the chromatic dispersion compensator and thereby measures the cumulative chromatic dispersion or the change in cumulative chromatic dispersion of the entire section to be compensated by the chromatic dispersion compensator, the section including the optical fiber transmission line and the chromatic dispersion compensator. In this case, a feed-back control is applied to the chromatic dispersion of the chromatic dispersion compensator in such a manner that the cumulative chromatic dispersion as viewed from the entire section to be compensated by the chromatic dispersion compensator, the section including the optical fiber transmission line and the chromatic dispersion compensator, is maintained substantially zero.

If the amount of chromatic dispersion or the temperature dependence of the chromatic dispersion that is to be controlled for the temperature fluctuation is already known, the value of chromatic dispersion need not be monitored. In this case, the chromatic dispersion compensating module according to the present invention determines the temperature to be set based on the amount of chromatic dispersion necessary to be controlled and the temperature dependence of the chromatic dispersion, and hence, the chromatic dispersion compensating module may additionally comprise a structure which controls the temperature of the chromatic dispersion compensator while monitoring the temperature of the chromatic dispersion compensator. More specifically, the chromatic dispersion compensating module may further comprise, in addition to the chromatic dispersion controlling unit which controls the temperature control unit, a temperature measuring unit which predicts the cumulative chromatic dispersion or the change in cumulative chromatic dispersion as viewed from the entire section to be compensated by the chromatic dispersion compensator, the section including the optical fiber transmission line and the chromatic dispersion compensator.

On the other hand, the optical transmission system according to the present invention comprises an optical fiber transmission line and a chromatic dispersion compensating module as described above, which compensates for the chromatic dispersion of the optical fiber transmission line. In accordance with the optical transmission system, at a predetermined wavelength of, for example, 1550 nm, the chromatic dispersion of the optical fiber transmission line can be compensated by the chromatic dispersion compensating module. Furthermore, even if the chromatic dispersion of the optical fiber transmission line should fluctuate due to some factors such as a temperature fluctuation, the temperature of the chromatic dispersion compensator is properly controlled by the temperature controller. In this manner, the cumulative chromatic dispersion as viewed from the entire optical transmission system or the entire section to be compensated by the chromatic dispersion compensator can be reduced as to enable a signal transmission at a high bit rate.

The chromatic dispersion compensating module applied to the optical transmission system according to the present invention is preferably installed at the down stream side of the optical fiber transmission line to be compensated, i.e., at a position located between the light output end of the optical fiber transmission line and the receiver. Furthermore, since the compensation amount of the chromatic dispersion is optimally controlled in case the chromatic dispersion compensating module comprises the chromatic dispersion measuring unit and the chromatic dispersion controlling unit, the signal transmission can be performed constantly at a high bit rate.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Preferred embodiments of chromatic dispersion compensating module and optical transmission systems using the same according to the present invention are described below by making reference to FIGS. 1, 2, 3A, 3B, and 4 to 12. In the description below, the same elements shown in the figures are referred by attaching the same symbols to omit repeated explanation.

First Embodiment of an Optical Transmission System

Figure 1:
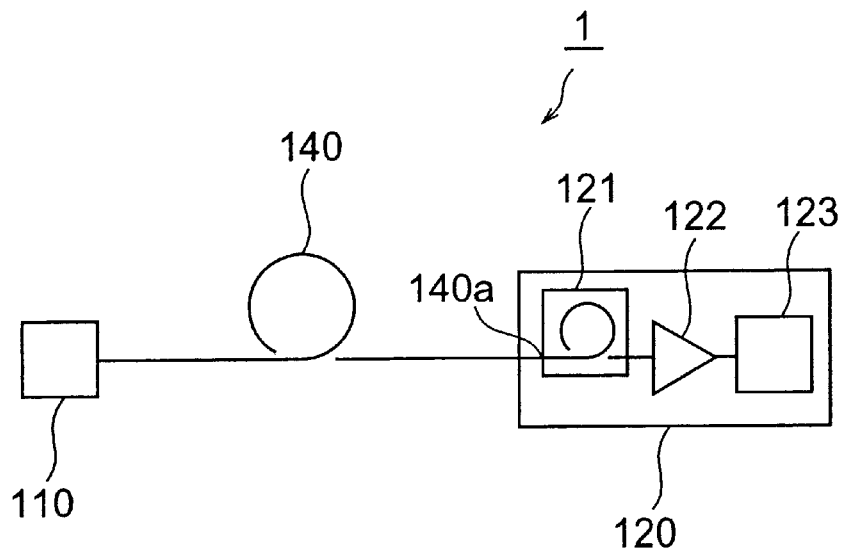
FIG. 1 is a diagram showing a constitution of a first embodiment of an optical transmission system according to the present invention.

FIG. 1 is a diagram showing schematically a constitution of a first embodiment of an optical transmission system according to the present invention. Referring to the figure, an optical transmission system 1 comprises a transmitter 110, a receiver 120, and an optical fiber transmission line 140 arranged between these transmitter 110 and the receiver 120. A chromatic dispersion compensating module 121, an optical amplifier 122, and a receiver 123 are provided inside the receiver 120, and the chromatic dispersion compensating module 121 is located between the light output end 140a of the optical fiber transmission line 140 and the receiver 123. In the optical transmission system 1, the signals transmitted from the transmitter 110 propagate through the optical fiber transmission line 140 and reaches to the receiver 120. The signals that have reached the receiver 120 is amplified by the optical amplifier 122 after passing through the chromatic dispersion compensating module 121, and finally, the amplified signals are received by the receiver 123.

In order to compensate for the chromatic dispersion inside the optical fiber transmission line 140, the chromatic dispersion compensating module 121 at least comprises a chromatic dispersion compensator and a temperature controller. The chromatic dispersion compensator has a chromatic dispersion differed in polarity (sign) from that of the chromatic dispersion of the optical fiber transmission line 140 and a chromatic dispersion slope differed in polarity (sign) from that of the chromatic dispersion slope of the optical fiber transmission line 140 at a predetermined wavelength of, for example, 1550 nm. The temperature controller sets the chromatic dispersion of the chromatic dispersion compensator at a desired value by controlling the temperature of the chromatic dispersion compensator. Furthermore, the chromatic dispersion compensator preferably comprises a dispersion compensating optical fiber to minimize the insertion loss.

Figure 2:
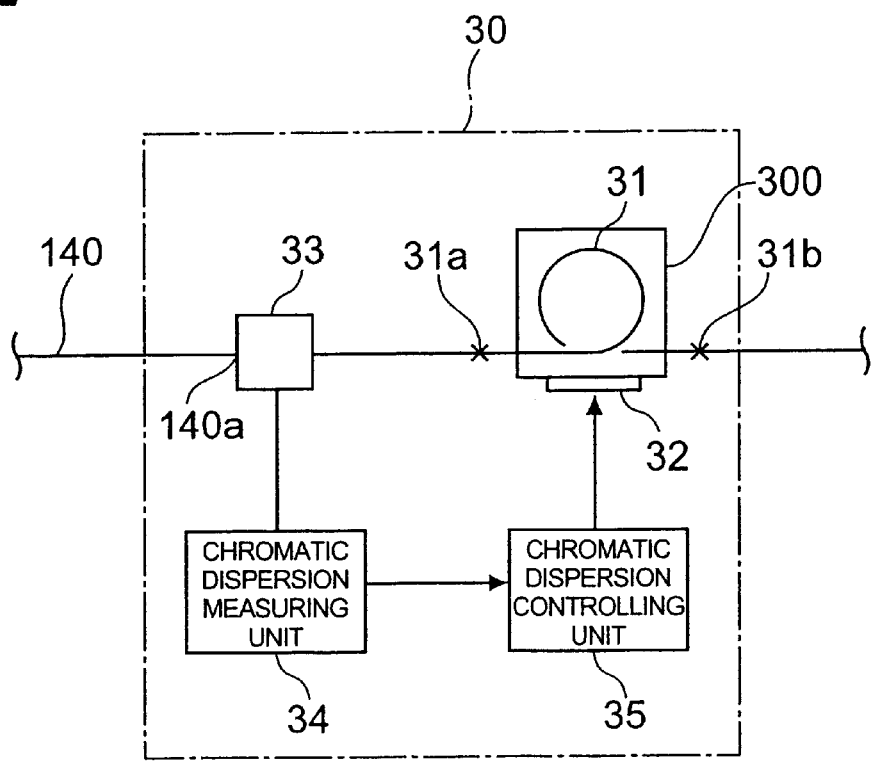
FIG. 2 is a diagram showing a constitution of a first embodiment of a chromatic dispersion compensating module applicable to an optical transmission system according to the present invention (i.e., a chromatic dispersion compensating module according to the present invention)

FIG. 2 is a diagram showing a constitution of a first embodiment of a chromatic dispersion compensating module applicable to an optical transmission system according to the present invention (i.e., a chromatic dispersion compensating module according to the present invention). Referring to the figure, a chromatic dispersion compensating module 30 according to a first embodiment of the present invention is applicable to the optical transmission system 1 shown in FIG. 1, and comprises a dispersion compensating optical fiber 31 provided as a dispersion compensator located inside a casing 300 for temperature control, a temperature controller 32 which controls the temperature inside the casing 300

(i.e., the temperature of the chromatic dispersion compensator), an optical branching unit 33, a chromatic dispersion measuring unit 34, and a chromatic dispersion controlling unit 35.

The dispersion compensating optical fiber 31 functions as to compensate for the chromatic dispersion of the optical fiber transmission line 140, and has a chromatic dispersion differed in polarity (sign) from that of the chromatic dispersion of the optical fiber transmission line 140 and a chromatic dispersion slope differed in polarity (sign) from that of the chromatic dispersion slope of the optical fiber transmission line 140 at a predetermined wavelength of, for example, 1550 nm. At the predetermined wavelength, the temperature dependence of the chromatic dispersion of the dispersion compensating optical fiber 31, more specifically, the absolute value of the change of chromatic dispersion per unit temperature, is preferably larger than the absolute value of the temperature dependence of the chromatic dispersion in the optical fiber transmission line 140 (i.e., chromatic dispersion fluctuation per unit temperature). In this manner, the chromatic dispersion compensation can be efficiently performed by using the dispersion compensating optical fiber 31 shorter than the optical fiber transmission line 140, furthermore, the chromatic dispersion compensation can be efficiently performed by providing a temperature change smaller than that of the optical fiber transmission line 140 (which depends on the temperature change of the environment in which the optical fiber transmission line 140 is installed) to the dispersion compensating optical fiber 31. Furthermore, at the predetermined wavelength, the absolute value of temperature dependence of chromatic dispersion of the dispersion compensating optical fiber 31 is preferably 0.002 ps/nm/km/° C. or more. In this manner, chromatic dispersion compensation can be efficiently performed by the temperature change of the dispersion compensating optical fiber 31.

The temperature controller 32 comprises a heater or a Peltier element for controlling the temperature of the dispersion compensating optical fiber 31. More specifically, the temperature controller 32 controls the temperature of the dispersion compensating optical fiber 31 through the temperature control of the bobbin on which the dispersion compensating optical fiber 31 is wound; or, the temperature of the dispersion compensating optical fiber 31 is controlled by the temperature control of the case 300 in which the dispersion compensating optical fiber 31 is enclosed. Furthermore, in case the dispersion compensating optical fiber 31 is constructed from a plurality of dispersion compensating optical fibers differing from each other in the compensation wavelength region and each wound on a bobbin, the plurality of dispersion compensating optical fibers can be each temperature controlled independently.

The optical branching unit 33 partly branches the light output from the light output end 140a of the optical fiber transmission line 140 and leads it to the chromatic dispersion measuring unit 34, while branching the rest of the light to the dispersion compensating optical fiber 31. The chromatic dispersion measuring unit 34 receives the light sent out from the optical branching unit 33, and measures the cumulative chromatic dispersion or the change in the cumulative chromatic dispersion in the optical fiber transmission line 140. The chromatic dispersion controlling unit 35 controls the temperature controller 32 based on the results measured by the chromatic dispersion measuring unit 34, by controlling feed forward the chromatic dispersion of the dispersion compensating optical fiber 31. In this instance, the chromatic dispersion controlling unit 35 controls the temperature controller 32 in such a manner that the chromatic dispersion of the dispersion compensating optical fiber 31 can be changed for a change corresponding to the absolute value equal to that of the change in cumulative chromatic dispersion of the optical fiber transmission line 140, but with an opposite sign. By employing such a constitution, the cumulative chromatic dispersion is always maintained at approximately zero as viewed from the entire optical transmission system inclusive of the optical fiber transmission line 140 and the dispersion compensating optical fiber 31.

Figure 3A:
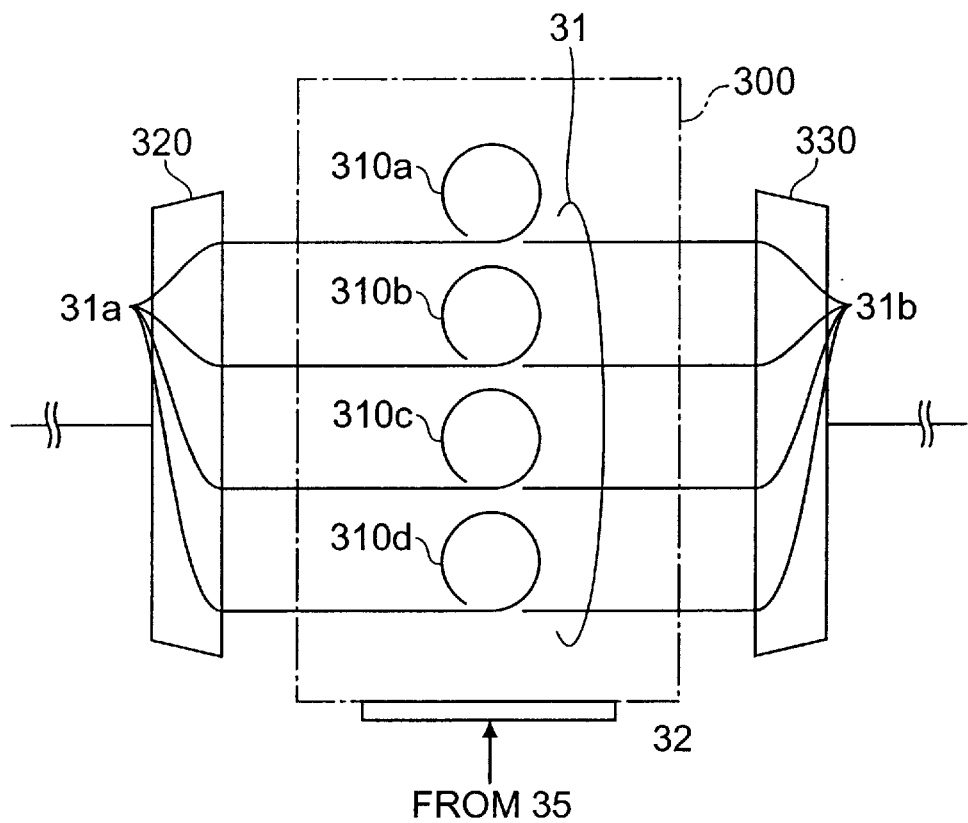
FIG. 3A and FIG. 3B are each a diagram showing the constitution of an application example of the chromatic dispersion compensator in a chromatic dispersion compensating module according to the present invention.
Figure 3B:
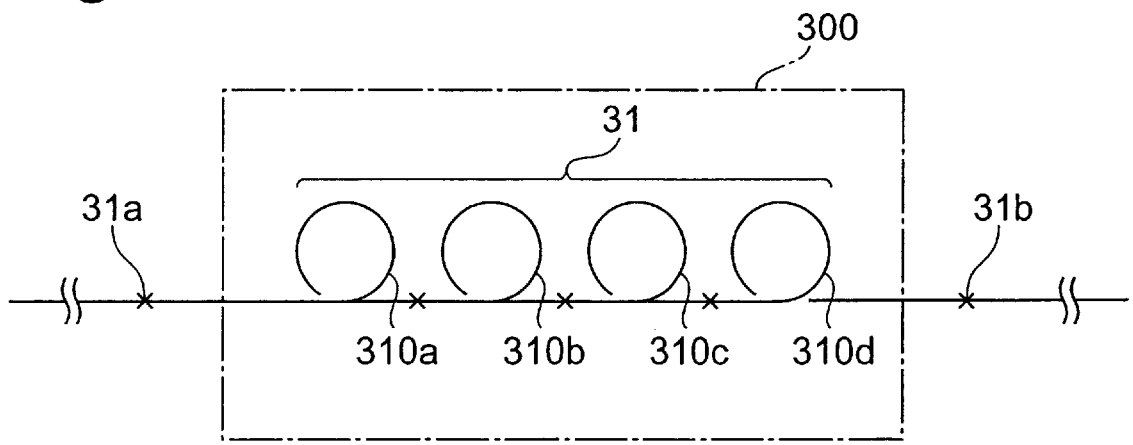

In FIG. 2 is shown a unitary dispersion compensating optical fiber 31 as the chromatic dispersion compensator. As the chromatic dispersion compensator, there can be applied various types of constitutions as are shown in FIG. 3A and FIG. 3B. For example, as a first application example of the chromatic dispersion compensator, there can be shown a constitution shown in FIG. 3A, which comprises parallel arranged dispersion compensating optical fibers 310a to 310d differing from each other in the compensation wavelength region collectively into a dispersion compensating optical fiber 31 as the chromatic dispersion compensator between a demultiplexer 320 which demultiplexes the signals outputted from the optical fiber transmission line 140 into each of the wavelength bands and a multiplexer 330. In the first application example, each of the signals demultiplexed by the demultiplexer 320 propagate through one of the associated dispersion compensating optical fibers 310a to 310d, and are multiplexed by the multiplexer 330. Furthermore, as a second application example of the chromatic dispersion compensator, there can be shown a constitution shown in FIG. 3B, in which the dispersion compensating optical fibers 310a to 310d having wavelength band regions for the dispersion compensation differed from each other are serial connected.

However, in the first and the second application examples of the chromatic dispersion compensators, the temperature control can be performed on all of the dispersion compensating optical fibers 310a to 310d (for example, the temperature control is made inside the casing 300), or the temperature control can be made to a part of those dispersion compensating optical fibers 310a to 310d (for example, the temperature control can be made on each of the bobbins on which each of the dispersion compensating optical fibers is wound). Furthermore, the first and the second application examples of the chromatic dispersion compensators are applicable to any of the embodiments described below on the chromatic dispersion compensating modules according to the present invention.

The dispersion compensating optical fiber 31 which constitutes the chromatic dispersion compensator is fusion connected to other optical fibers by the optical input end and the optical output end thereof. The optical properties of this connection units might be fluctuated by the temperature fluctuation. Accordingly, in the constitution shown in FIG. 2, the influence of temperature control caused by the temperature controlling unit 32 on the dispersion compensating optical fiber 31 can be minimized by placing it outside the casing 300 (the region of applying temperature control) in which the dispersion compensating optical fiber 31 is enclosed. The connection units need only be placed at positions less influenced by the temperature control; hence, so long as they are less influenced by the temperature control, they may be positioned at the inside or the outside of the chromatic dispersion compensating module.

Figure 4:
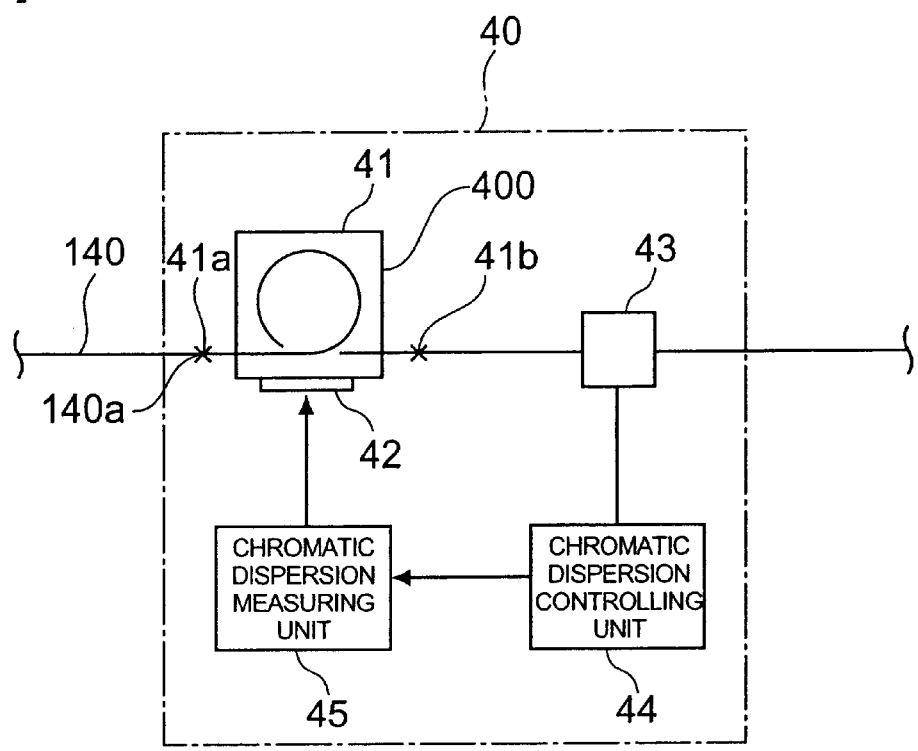
FIG. 4 is a diagram showing a constitution of a second embodiment of a chromatic dispersion compensating module applicable to an optical transmission system according to the present invention.

FIG. 4 shows a constitution of a second embodiment of a chromatic dispersion compensating module applicable to an optical transmission system according to the present invention. Referring to the figure, the chromatic dispersion compensating module 40 is also applicable as the chromatic dispersion compensating module 121 of the optical transmission system 1 shown in FIG. 1. The chromatic dispersion compensating module 40 comprises a dispersion compensating optical fiber 41, a temperature controller 42, an optical branching unit 43, a chromatic dispersion measuring unit 44, and a chromatic dispersion controlling unit 45, which are placed inside a case 400 to provide a chromatic dispersion compensator. In FIG. 4, there are also shown fused connection units 41a and 41b, which connect the optical input end of the dispersion compensating optical fiber 41 with the optical output end 140a of the optical fiber transmission line 140, and which connect the optical output end of the dispersion compensating optical fiber 41 with another optical fiber, respectively.

The dispersion compensating optical fiber 41 functions as to compensate for the chromatic dispersion of the optical fiber transmission line 140, and has a chromatic dispersion differed in polarity from that of the chromatic dispersion of the optical fiber transmission line 140 to be compensated and a chromatic dispersion slope differed in polarity from that of the chromatic dispersion slope of the optical fiber transmission line 140 at a predetermined wavelength of, for example, 1550 nm. Similarly, in the chromatic dispersion compensating module 40 according to the second embodiment, the absolute value of the temperature dependence of the chromatic dispersion (the change in chromatic dispersion per unit temperature) of the dispersion compensating optical fiber 41 at the predetermined wavelength is preferably larger than the absolute value of the temperature dependence of the chromatic dispersion of the optical fiber transmission line 140. In this manner, the chromatic dispersion compensation can be efficiently performed by using the dispersion compensating optical fiber 41 shorter than the optical fiber transmission line 140, furthermore, the chromatic dispersion compensation can be efficiently performed by providing a temperature change smaller than that of the optical fiber transmission line 140 to the dispersion compensating optical fiber 41. Furthermore, at the predetermined wavelength, the absolute value of temperature dependence of chromatic dispersion of the dispersion compensating optical fiber 41 is preferably 0.002 ps/nm/km/° C. or higher.

The temperature controller 42 comprises a heater or a Peltier element for controlling the temperature of the dispersion compensating optical fiber 41. More specifically, the temperature controller 42 controls the temperature of the dispersion compensating optical fiber 41 through the temperature control of the bobbin on which the dispersion compensating optical fiber 41 is wound; otherwise, the temperature of the dispersion compensating optical fiber 41 is controlled by the temperature control of the case 400 in which the dispersion compensating optical fiber 41 is enclosed.

The optical branching unit 43 partly branches the light output from the light output end 140a of the optical fiber transmission line 140 and leads it to the chromatic dispersion measuring unit 44, while branching the rest of the light to the outside of the chromatic dispersion compensating module 40. The chromatic dispersion measuring unit 44 receives the light sent out from the optical branching unit 43, and measures the cumulative chromatic dispersion or the change in the cumulative chromatic dispersion as seen from the entire optical transmission system inclusive of the optical fiber transmission line 140 and the dispersion compensating optical fiber 41. The chromatic dispersion controlling unit 45 performs feed-back control to control the chromatic dispersion of the dispersion compensating optical fiber 41 by controlling the temperature controller 42 based on the results measured by the chromatic dispersion measuring unit 44, in such a manner to set the temperature of the dispersion compensating optical fiber 41 at the desired value. In this instance, the chromatic dispersion controlling unit 45 controls the chromatic dispersion of the wavelength compensating optical fiber 41 in such a manner that the cumulative chromatic dispersion of the entire optical transmission system inclusive of the optical fiber transmission line 140 and the dispersion compensating optical fiber 41 as a whole becomes substantially zero.

Figure 5:
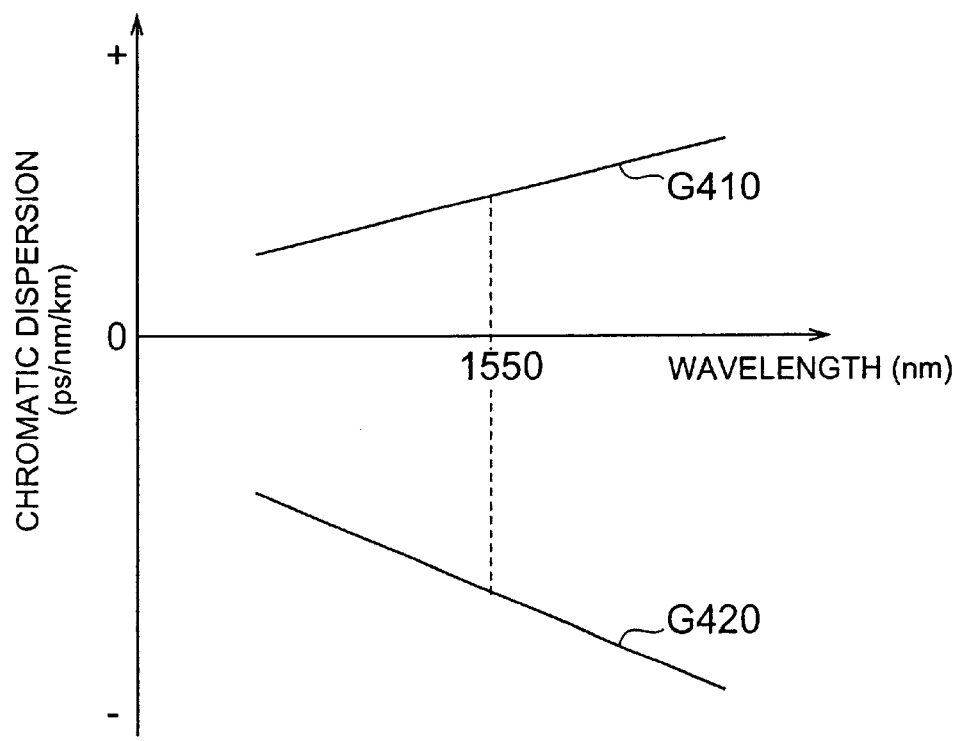
FIG. 5 is a graph showing the wavelength dependence of chromatic dispersion of each of the optical fiber transmission line and the chromatic dispersion of the chromatic dispersion compensating optical fiber.

FIG. 5 is a graph showing the wavelength dependence of the chromatic dispersion of the optical fiber transmission line 140 and the dispersion compensating optical fibers which function as the chromatic dispersion compensator. Referring to the figure, graph G410 shows the wavelength dependence of the chromatic dispersion in the optical fiber transmission line 140, and graph G420 shows the wavelength dependence of the chromatic dispersion in the dispersion compensating optical fibers. As shown in the graphs G410 and G420, at a predetermined wavelength of, for example, 1550 nm, the sign of the chromatic dispersion and the sign of the chromatic dispersion slope of the optical fiber transmission line 140 are differed from those of the dispersion compensating optical fibers. By thus differing the sign of the chromatic dispersion from each other, and by properly setting the ratio in the length of the optical fiber transmission line 140 and the dispersion compensating optical fiber, the cumulative chromatic dispersion at the predetermined wavelength can be reduced as viewed from the entire optical transmission system 1. Furthermore, because the optical fiber transmission line 140 and the dispersion compensating optical fiber are opposite to each other in the sign of the wave dispersion slope, the cumulative chromatic dispersion as viewed from the entire optical transmission system 1 over a wider signal optical wavelength band region for each of the signals of a plurality of wavelengths (Wavelength Division Multiplexing: WDM signals) can be effectively reduced.

Figure 6:
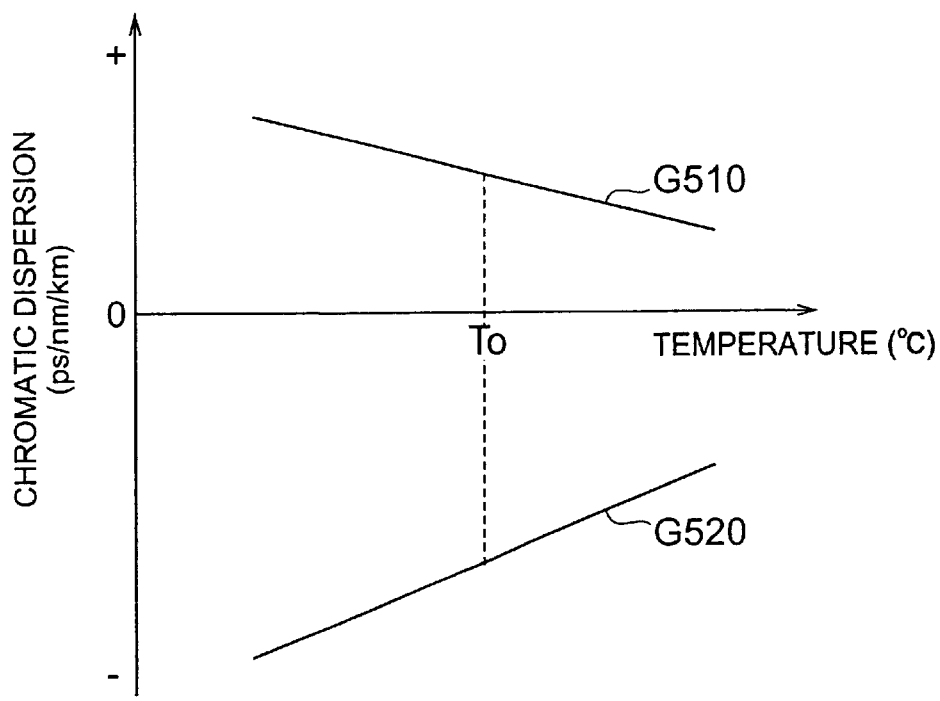
FIG. 6 is a graph showing the temperature dependence of chromatic dispersion of each of the optical fiber transmission line and the chromatic dispersion of the chromatic dispersion compensating optical fiber.

On the other hand, FIG. 6 is a graph showing the temperature dependence of the chromatic dispersion of the optical fiber transmission line 140 and each of the dispersion compensating optical fibers which functions as the chromatic dispersion compensator. Graph 510 shows the temperature dependence (ps/nm/km/° C.) of the chromatic dispersion in the optical fiber transmission line 140, and graph G520 shows the temperature dependence (ps/nm/km/° C.) of the chromatic dispersion in the dispersion compensating optical fiber. As shown in the graphs G510 and G520, the absolute value of the temperature dependence of chromatic dispersion in the dispersion compensating optical fibers at a predetermined wavelength preferably is greater than the absolute value of the temperature dependence of chromatic dispersion in the optical fiber transmission line 140. More specifically, the absolute value of temperature dependence of chromatic dispersion of the dispersion compensating optical fiber is preferably 0.002 ps/nm/km/° C. or more. By setting the temperature dependence of the chromatic dispersion in this manner, the temperature of the dispersion compensating optical fiber can be controlled by taking advantage of a slight temperature fluctuation to thereby realize a more efficient compensation in chromatic dispersion.

If the quantity of chromatic dispersion necessary for control with the temperature fluctuation or the temperature dependence of the chromatic dispersion is known, the value of the chromatic dispersion not always is necessary to be monitored. In this case, the chromatic dispersion compensating module according to the present invention may comprises a structure as such that determines the quantity of chromatic dispersion and the temperature to be set based on the temperature dependence of the chromatic dispersion, and that thereby controls the temperature of the chromatic dispersion compensator while monitoring the temperature of the chromatic dispersion compensator. More specifically, the chromatic dispersion compensating module 50 having a structure shown in FIG. 7 may be applied to the optical transmission system 1 shown in FIG. 1.

The chromatic dispersion compensating module 50 comprises a dispersion compensating optical fiber 51 which functions as a chromatic dispersion compensator inside the casing 500, a temperature measuring unit 54, and a chromatic dispersion controller unit 55. The light input end of the dispersion compensating optical fiber 51 is drawn out of the casing 500, and is fusion connected to the light emitting end 140a of the optical fiber transmission line 140, while the light emitting end of the dispersion compensating optical fiber 51 is also drawn out of the casing 500 and is fusion connected to the light input end of another optical fiber. In the figure, the fusion connected units are shown by 51a and 51b. A temperature sensor 53 is provided to the casing 500, such that the temperature measuring unit 53 may presume the cumulative chromatic dispersion or the change in cumulative chromatic dispersion as viewed from the entire optical transmission system 1 inclusive of the optical fiber transmission line 140 and the dispersion compensating optical fiber 51 by monitoring the temperature of the dispersion compensating optical fiber 51 (i.e., the temperature inside the casing 500). The chromatic dispersion controller unit 55 controls the temperature controller unit based on the measured results provided by the temperature measuring unit 54, such that the temperature of the dispersion compensating optical fiber 51 may maintain the desired value to thereby control the chromatic dispersion in the dispersion compensating optical fiber 51.

The specific constitution of the optical transmission system 1 according to the first embodiment of the present invention is described below. The specification of the optical fiber transmission line 140 applied to the optical transmission system 1 and the dispersion compensating optical fiber (included in the chromatic dispersion compensating module 121) at a wavelength of 1550 nm is as follows.

| (Dispersion compensating optical fibers 31, 41, or 51) | |
|---|---|
| Chromatic dispersion (ps/nm/km) | −102 |
| Chromatic dispersion slope (ps/nm$^2$/km) | −0.21 |
| Temperature dependence of chromatic dispersion (ps/nm/km/° C.) | 0.0057 |

The total length of the dispersion compensating optical fiber is 13.3 km.

| (Optical transmission line 140) | |
|---|---|
| Chromatic dispersion (ps/nm/km) | 17 |
| Chromatic dispersion slope (ps/nm$^2$/km) | 0.057 |
| Temperature dependence of chromatic dispersion (ps/nm/km/° C.) | −0.0015 |

The total length of the optical fiber transmission line 140 is 80 km.

The optical fiber transmission line 140 is a standard single mode optical fiber having a zero-dispersion wavelength in the wavelength band of 1.3 μm. The optical fiber transmission line (single mode optical fiber) 140 yields a chromatic dispersion of 17 ps/nm/km and a chromatic dispersion slope of 0.057 ps/nm$^2$/km for a wavelength of 1550 nm at a predetermined temperature. The temperature dependence of the chromatic dispersion is −0.0015 ps/nm/km/° C.

On the other hand, the dispersion compensating optical fiber which functions as the chromatic dispersion compensator yields a chromatic dispersion of −102 ps/nm/km and a chromatic dispersion slope of −0.21 ps/nm$^2$/km for a wavelength of 1550 nm at a predetermined temperature. The temperature dependence of the chromatic dispersion is 0.0057 ps/nm/km/° C. In this manner, the optical fiber transmission line (single mode optical fiber) 140 and the dispersion compensating optical fiber provided as the chromatic dispersion compensator yield, at a wavelength of 1550 nm, a chromatic dispersion with the sign opposite to each other and a chromatic dispersion slope with the sign also opposite to each other.

In case the length of the optical fiber transmission line 140 is 80 km, the cumulative chromatic dispersion of this optical fiber transmission line 140 at a wavelength of 1550 nm is 1360 ps/nm (=17 (ps/nm/km)×80 (km)). Thus, the length of the dispersion compensating optical fiber necessary to cancel out the cumulative chromatic dispersion of this optical fiber transmission line 140 is 13.3 km (=1360 (ps/nm)/102 (ps/nm/km)).

If the temperature of the optical fiber transmission line 140 is raised by 10° C. in the above case, the cumulative chromatic dispersion of the optical fiber transmission line 140 at a wavelength of 1550 nm changes by −1.2 ps/nm (=−0.0015 (ps/nm/km/° C.)×80 (km))×10 (° C.)). Then, the temperature change of the dispersion compensating optical fiber necessary to cancel out for this change in cumulative chromatic dispersion of the optical fiber transmission line 140 attributed to the temperature fluctuation becomes 15.8° C. (=1.2 (ps/nm)/0.0057 (ps/nm/km/° C.)/13.3 (km)).

As described above, even if the chromatic dispersion should change due to a temperature fluctuation of the optical fiber transmission line 140, the temperature of the dispersion compensating optical fiber provided as the chromatic dispersion compensator can be controlled in a practical range; hence, the absolute value of the cumulative chromatic dispersion as viewed from the entire optical fiber transmission system 1 inclusive of the optical fiber transmission line 140 and the dispersion compensating optical fiber can be constantly suppressed to a small value.

In the above-mentioned constitution, the measured results of the cumulative chromatic dispersion of the optical fiber transmission line 140 measured by the receiver 120 need not be acknowledged to the transmitter 110, and thus, a communication means or a signal transmission line for transmitting the measured results is not necessary. Furthermore, the wavelength of the signals transmitted from the transmitter 110 need not be controlled, nor there is need to, prepare a light source with a wavelength changeable wavelength. In this manner, the chromatic dispersion compensating module according to the present invention and the optical transmission system included therein enable a signal transmission at a higher bit rate by compensating for the chromatic dispersion of the optical fiber transmission line 140, yet by its simpler constitution as compared with that of a conventional optical transmission system.

Second Embodiment of an Optical Transmission System

Figure 8:
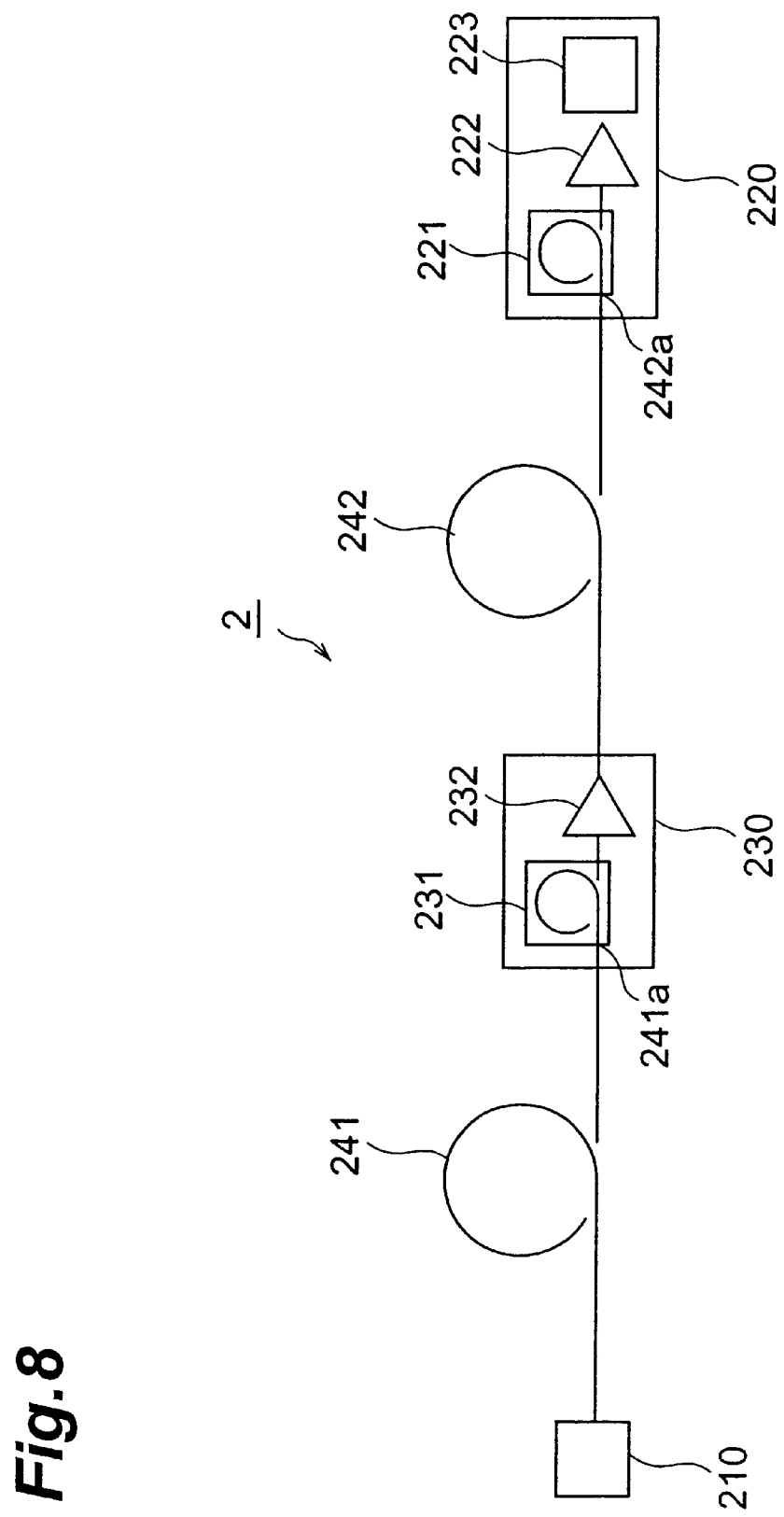
FIG. 8 is a diagram showing a constitution of a second embodiment of an optical transmission system according to the present invention.

FIG. 8 is a diagram showing schematically a constitution of a second embodiment of an optical transmission system 2 according to the present invention. Referring to the figure, the optical transmission system 2 comprises a transmitter 210 and a repeater 230 with an optical fiber transmission line 241 provided therebetween, and a receiver 220 and a repeater 230 with an optical fiber transmission line 242 provided therebetween. Inside the receiver 220 are provided a chromatic dispersion compensating module 221, an optical amplifier 222, and a receiver unit 223. Inside the repeater 230 are provided a chromatic dispersion compensating module 231 and an optical amplifier 232. In this optical transmission system 2, the signals transmitted from the transmitter 210 reaches the repeater 230 after propagating inside the optical fiber transmission line 241. In the repeater 230, the signals having passed through the chromatic dispersion compensating module 231 are amplified by the optical amplifier 232. The signals amplified by the optical amplifier 232 are output from the optical fiber transmission line 242 provided at the downstream, and propagate through the optical fiber transmission line 242 to reach the receiver 220. In the receiver 220, the signals having passed through the chromatic dispersion compensating module 221 are amplified by the optical amplifier 222. Finally, the amplified signals are received by the receiver unit 223.

Figure 7:
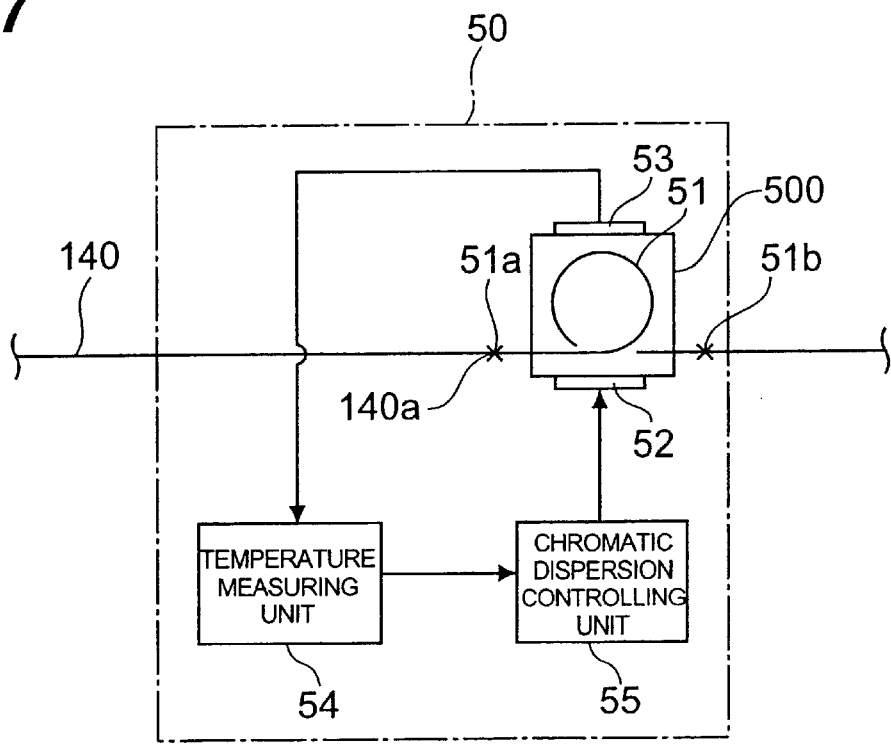
FIG. 7 is a diagram showing a constitution of a third embodiment of a chromatic dispersion compensating module applicable to an optical transmission system according to the present invention.

The chromatic dispersion compensating module 221 and 231 of the optical transmission system 2 according to the second embodiment each have a structure similar to those shown in FIG. 2, FIG. 4, or FIG. 7. The chromatic dispersion compensators (dispersion compensation optical fibers) of each of the chromatic dispersion compensating modules 221 and 231 have the wavelength dependence of the chromatic dispersion as shown in FIG. 5, as well as the temperature dependence of the chromatic dispersion as shown in FIG. 6. In this case, the chromatic dispersion compensating module 231 provided inside the repeater 230 compensates for the chromatic dispersion of the optical fiber transmission line 241 arranged between the transmitter 210 and the repeater 230, and the chromatic dispersion compensating module 221 provided inside the receiver 220 compensates for the chromatic dispersion of the optical fiber transmission line 242 arranged between the repeater 230 and the receiver 220. Each of the chromatic dispersion compensating modules 221 and 231 operates in a manner described above.

In the optical transmission system 2 according to the second embodiment of the present invention, the chromatic dispersion compensating module 221 inside the receiver 220 has a structure similar to the structure shown in FIG. 2, FIG. 4, or FIG. 7, but there is no particular need for the chromatic dispersion compensating module 231 inside the repeater 230 that it comprises a chromatic dispersion measuring unit and a chromatic dispersion controlling unit. For example, the structure may have a structure as such that it only realizes the function of maintaining the temperature of the dispersion compensating optical fiber constant, and it need not control the temperature of the dispersion compensating optical fiber. In this case, the chromatic dispersion compensating module 221 inside the receiver 220, together with the chromatic dispersion compensating module 231 provided inside the repeater 230, compensates for the chromatic dispersion inside the optical fiber transmission lines 241 and 242.

Then, the structure of the optical transmission system 2 according to the second embodiment of the present invention is described more specifically below. The specification for each of the optical fiber transmission lines 241, 242, and the dispersion compensating optical fiber (included in each of the chromatic dispersion compensating modules 221 and 231) provided as the chromatic dispersion compensators applied to this optical transmission system 2 at a wavelength of 1550 nm is as follows.

| (Dispersion compensating optical fibers 31, 41, or 51) | |
|---|---|
| Chromatic dispersion (ps/nm/km) | −36 |
| Chromatic dispersion slope (ps/nm$^2$/km) | −0.18 |
| Temperature dependence of chromatic dispersion (ps/nm/km/° C.) | 0.0049 |

The total length of the dispersion compensating optical fiber is (12.5×2) km.

| (Optical fiber transmission line 140) | |
|---|---|
| Chromatic dispersion (ps/nm/km) | 9 |
| Chromatic dispersion slope (ps/nm$^2$/km) | 0.070 |
| Temperature dependence of chromatic dispersion (ps/nm/km/° C.) | −0.0019 |

The total length of the optical transmission line is (50×2) km.

The optical fiber transmission lines 241 and 242 each yields a chromatic dispersion of 9 ps/nm/km and a chromatic dispersion slope of 0.070 ps/nm$^2$/km for a wavelength of 1550 nm at a predetermined temperature. The temperature dependence of the chromatic dispersion is −0.0019 ps/nm/km/° C. On the other hand, each of the dispersion compensating optical fibers inside the chromatic dispersion compensating modules 221, 231 yields achromatic dispersion of −36 ps/nm/km and a chromatic dispersion slope of −0.18 ps/nm$^2$/km for a wavelength of 1550 nm at a predetermined temperature. The temperature dependence of the chromatic dispersion is 0.0049 ps/nm/km/° C. In this manner, the optical fiber transmission lines (single mode optical fibers) 241 and 242 and each of the dispersion compensating optical fibers inside the chromatic dispersion compensating modules 221 and 231 yield, at a wavelength of 1550 nm, a chromatic dispersion with the sign opposite to each other and a chromatic dispersion slope with the sign also opposite to each other.

In case the length of the optical fiber transmission lines 241 and 242 is 50 km, the cumulative chromatic dispersion of these optical fiber transmission lines 241 and 242 in total at a wavelength of 1550 nm is 900 ps/nm (=9 (ps/nm/km)× 50 (km)×2). Since the length of the entire dispersion compensating optical fiber necessary to cancel out the cumulative chromatic dispersion of these optical fiber transmission lines 241 and 242 in total is 25 km (=900 (ps/nm)/36 (ps/nm/km)), the dispersion compensating optical fiber inside the chromatic dispersion compensating module 221 is set at a length of 12.5 km, and the dispersion compensating optical fiber inside the chromatic dispersion compensating module 231 is also set at a length of 12.5 km.

If the temperature of the optical fiber transmission lines 241 and 242 is raised by 10° C. in the above-mentioned case, the cumulative chromatic dispersion of the entire optical fiber transmission lines 241 and 242 at a wavelength of 1550 nm changes by −1.9 ps/nm (=−0.0019 (ps/nm/km/° C.)×50 (km)×2×10 (° C.)). If we presume that the cumulative chromatic dispersion of the dispersion compensating optical fiber included in the chromatic dispersion compensating module 231 inside the repeater 230 is constant, and that the change in cumulative chromatic dispersion of the entire optical fiber transmission lines 241 and 242 attributed to this temperature fluctuation is cancelled out by the dispersion compensating optical fiber included in the chromatic dispersion compensating module 221 inside the receiver 220, the temperature change for the dispersion compensating optical fiber inside the chromatic dispersion compensating module 221 necessary to cancel out for this change becomes 31.0° C. (=1.9 (ps/nm)/0.0049 (ps/nm/km/° C.)/12.5 (km)).

As described above, even if the chromatic dispersion should change due to a temperature fluctuation of the optical fiber transmission lines 241 and 242, the temperature of the dispersion compensating optical fiber provided inside the chromatic dispersion compensating module 221 in the receiver unit 220 can be controlled in a practical range; hence, the absolute value of the cumulative chromatic dispersion as viewed from the entire optical transmission system 2 inclusive of the optical fiber transmission lines 241 and 242, as well as the dispersion compensating optical fibers provided inside the chromatic dispersion compensating modules 221 and 231 can be constantly suppressed to a small value.

Furthermore, in case of controlling not only the temperature of the dispersion compensating optical fiber included in the chromatic dispersion compensating module 221 inside the receiver unit 220, but also the temperature of the dispersion compensating optical fiber included in the chromatic dispersion compensating module 231 inside the repeater 230, the temperature change for each of the dispersion compensating optical fibers can be set as 15.5° C. (=31.0 (° C.)/2) for a temperature change of 10° C. in the optical fiber transmission lines 241 and 242.

In the optical transmission system 2 according to the second embodiment of the present invention, the result of the cumulative chromatic dispersion measured for the optical fiber transmission lines 241 and 242 at the receiver 220 need not be acknowledged to the transmitter 210, there is no need of providing a communication means or a signal transmission line for acknowledging the measured results. Furthermore, since there is no need of controlling the wavelength of the signals transmitted from the transmitter 210, there is also no need for preparing a light source with a wavelength changeable function as the particular light source to output the signals. In this manner, the optical transmission system 2 according to the second embodiment of the present invention enables a signal transmission at a higher bit rate by compensating for the chromatic dispersion of the optical fiber transmission lines 241 and 242, yet by a simpler constitution as compared with that of a conventional optical transmission system.

It should be understood that the chromatic dispersion compensating module according to the present invention is not only limited to the constitution described hereinbefore, but that various types of modifications are possible. For example, in the description of each of the embodiments, specific explanations have been made on the cases in which the chromatic dispersion of the optical fiber transmission lines fluctuates due to a temperature fluctuation. However, in the cases in which the chromatic dispersion of the optical fiber transmission lines fluctuates due to other factors, there can be similarly employed a constitution as such that the chromatic dispersion fluctuation of the optical fiber transmission line is cancelled out by controlling the temperature of the chromatic dispersion compensator (i.e., the dispersion compensating optical fiber). Furthermore, the chromatic dispersion compensating module according to the present invention is also applicable to WDM (Wavelength Division Multiplexing) transmission systems which transmit signals having wavelengths different from each other.

Figure 9:
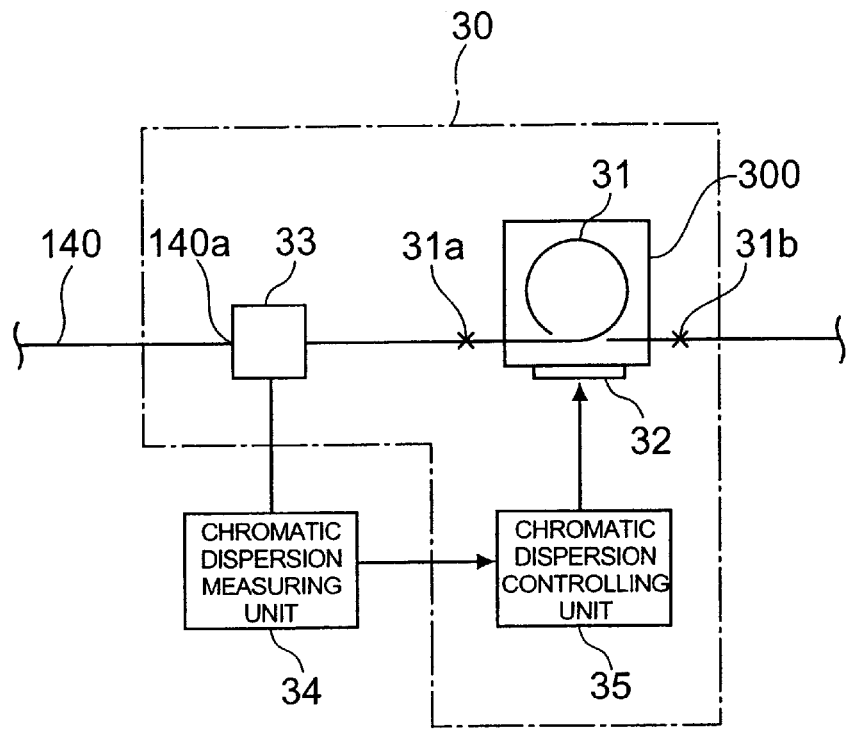
FIG. 9 is a diagram showing a constitution of a fourth embodiment of a chromatic dispersion compensating module applicable to an optical transmission system according to the present invention.
Figure 10:
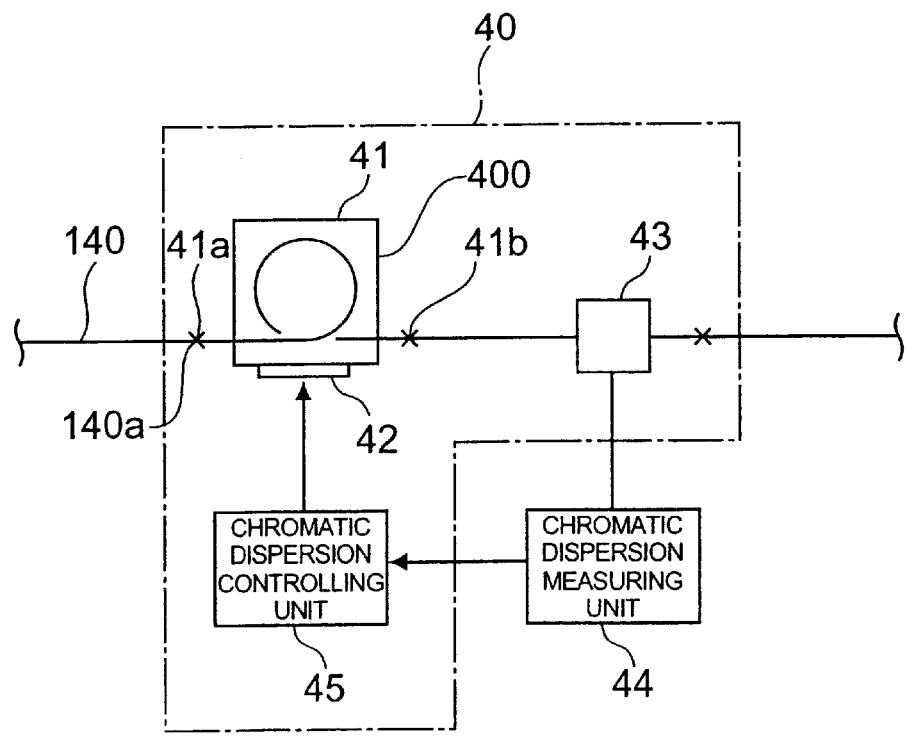
FIG. 10 is a diagram showing a constitution of a fifth embodiment of a chromatic dispersion compensating module applicable to an optical transmission system according to the present invention.
Figure 11:
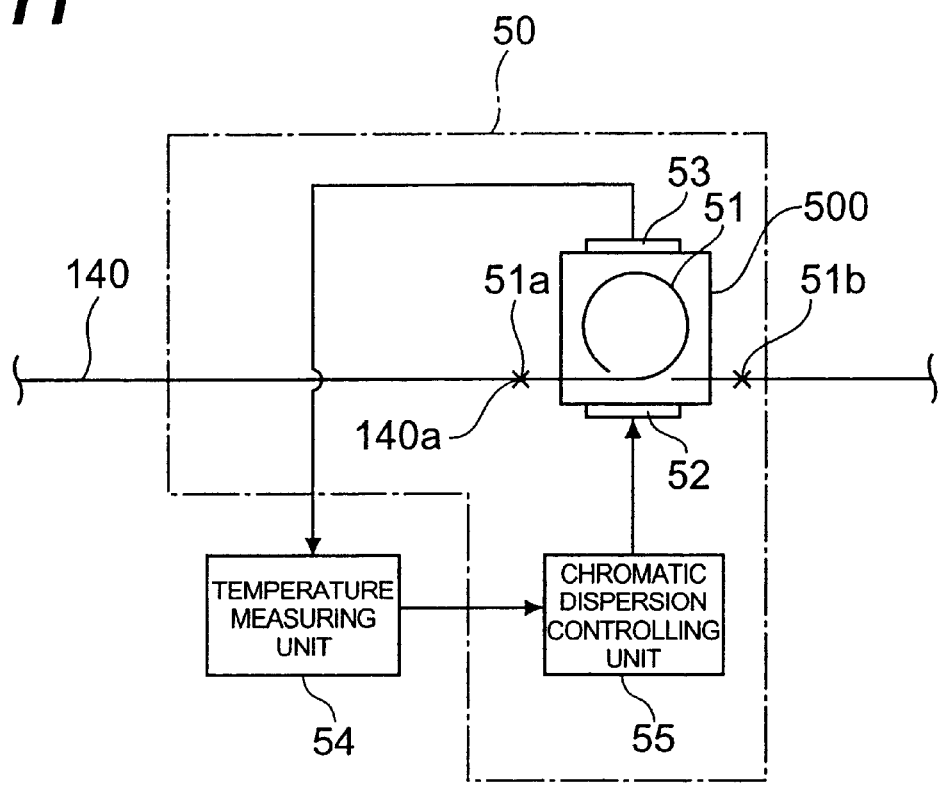
FIG. 11 is a diagram showing a constitution of a sixth embodiment of a chromatic dispersion compensating module applicable to an optical transmission system according to the present invention.
Figure 12:
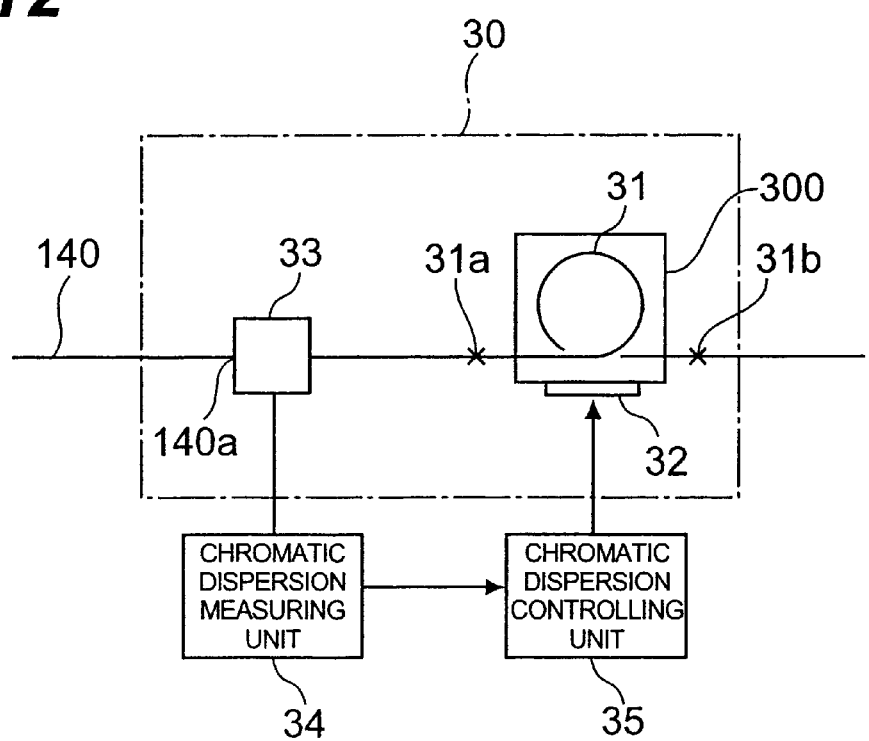
FIG. 12 is a diagram showing a constitution of a seventh embodiment of a chromatic dispersion compensating module applicable to an optical transmission system according to the present invention.
Figure 13:
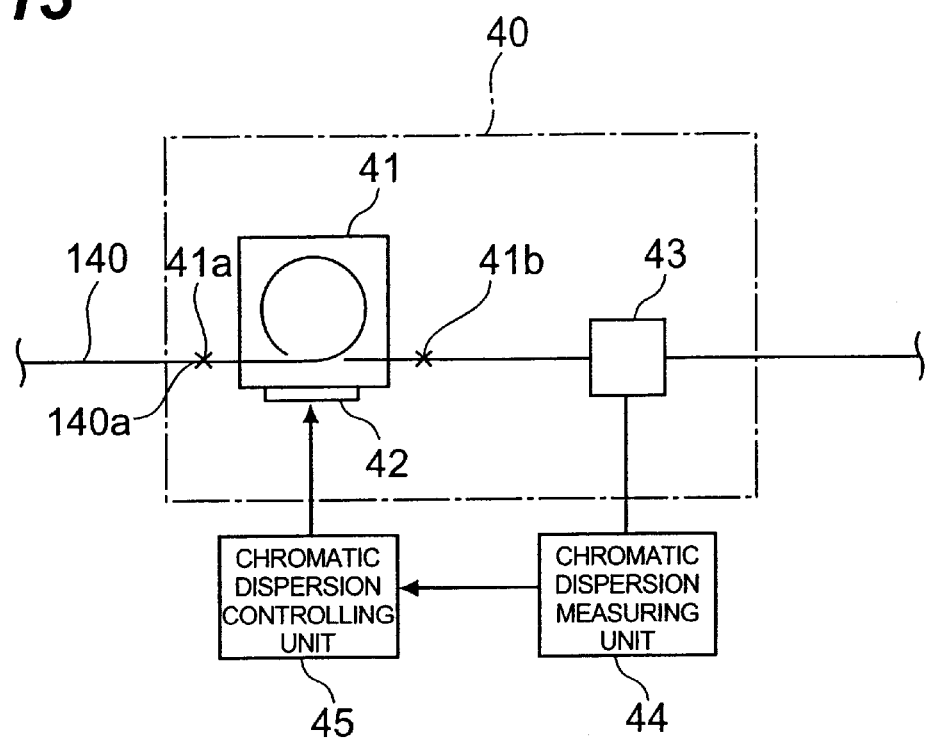
FIG. 13 is a diagram showing a constitution of an eighth embodiment of a chromatic dispersion compensating module applicable to an optical transmission system according to the present invention.
Figure 14:
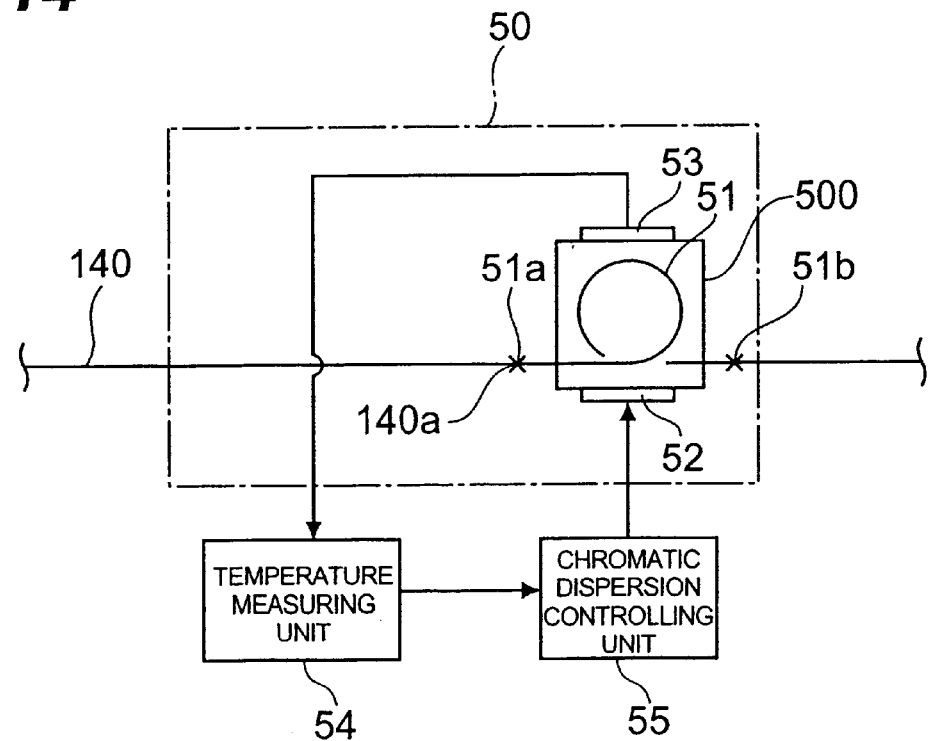
FIG. 14 is a diagram showing a constitution of a ninth embodiment of a chromatic dispersion compensating module applicable to an optical transmission system according to the present invention.

In addition, the chromatic dispersion compensating modules 30 and 40 shown in FIG. 2 and FIG. 4 are each constituted by dispersion compensating optical fibers 31 and 41, temperature controllers 32 and 42, optical branching units 33 and 43, chromatic dispersion measuring units 34 and 44, and chromatic dispersion controlling units 35 and 45. However, for example, as shown in FIG. 9 and FIG. 10, the chromatic dispersion compensating modules 30 and 40 may each be constituted with dispersion compensating optical fibers 31 and 41, temperature controllers 32 and 42, optical branching units 33 and 43, and chromatic dispersion controlling units 35 and 45 (to provide chromatic dispersion compensating modules according to the fourth and the fifth embodiments of the present invention, respectively), and chromatic dispersion measuring units 34 and 44 can be provided separately. In the chromatic dispersion compensating module 50 shown in FIG. 7, a temperature measuring unit 53 may be provided to the outside of the module 50 as shown in FIG. 11 (to provide a chromatic dispersion compensating module according to a sixth embodiment of the present invention). Still further, as shown in FIG. 12 and FIG. 13, dispersion compensating optical fibers 31 and 41, temperature controllers 32 and 42, and optical branching units 33 and 43 may be used to constitute the chromatic dispersion compensating modules 30 and 40 (to provide chromatic dispersion compensating modules according to the seventh and the eighth embodiments of the present invention, respectively), and chromatic dispersion measuring units 34 and 44 as well as the chromatic dispersion controlling units 35 and 45 may be provided to the outside of the temperature controlling regions. Similarly, for the chromatic dispersion compensating module 50 shown in FIG. 7, a temperature measuring unit 53 and a chromatic dispersion controlling unit 55 may be provided to the outside of the module 50 as shown in FIG. 14 (to provide a chromatic dispersion compensating module according to a ninth embodiment of the present invention). The above-mentioned embodiments each operates in the same manner as the chromatic dispersion compensating modules 30, 40, and 50 shown in FIG. 2, FIG. 4, and FIG. 7 as described above. Furthermore, the chromatic dispersion compensating modules according to the above-mentioned embodiments may be provided with a chromatic dispersion compensator having the structure as shown in FIG. 3A and FIG. 3B.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

As described above, the chromatic dispersion compensating module according to the present invention comprises an optical fiber transmission line and a chromatic dispersion compensator yielding a chromatic dispersion of opposite signs at a predetermined wavelength of, for example, 1550 nm. Accordingly, the cumulative chromatic dispersion as viewed from the entire optical transmission system to which the chromatic dispersion compensating module is applied can be effectively reduced. Furthermore, since the chromatic dispersion slope for the optical fiber transmission line and the chromatic dispersion compensator also are opposite in signs, the cumulative chromatic dispersion as viewed from the entire optical transmission system can also be effectively reduced for each of the signals having a plurality of wavelengths over a wider signal wavelength band region. Moreover, even in case the chromatic dispersion of the optical fiber transmission line should be changed due to a temperature fluctuation or other factors, the temperature of the chromatic dispersion compensator can be set at a desired value by the temperature controller, the cumulative chromatic dispersion as viewed from the entire optical transmission system can be effectively reduced.

What is claimed is:

1. A chromatic dispersion compensating module, which compensates for a chromatic dispersion of an optical fiber transmission line, comprising:

a chromatic dispersion compensator having, at a predetermined wavelength, a chromatic dispersion with a sign opposite to that of the chromatic dispersion of said optical fiber transmission line, and a chromatic dispersion slope with a sign opposite to that of the chromatic dispersion slope of said optical fiber transmission line; and a temperature controller that controls a temperature of said chromatic dispersion compensator in such a manner that the chromatic dispersion of said chromatic dispersion compensator is set at a desired value, wherein said chromatic dispersion compensator comprises one or more of dispersion compensating optical fibers, and wherein, at a predetermined wavelength, the absolute value of the chromatic dispersion fluctuation per unit temperature of said dispersion compensating optical fibers is larger than the absolute value of the chromatic dispersion fluctuation per unit temperature of said optical fiber transmission line.

2. A chromatic dispersion compensating module, which compensates for a chromatic dispersion of an optical fiber transmission line, comprising:

a chromatic dispersion compensator having, at a predetermined wavelength, a chromatic dispersion with a sign opposite to that of the chromatic dispersion of said optical fiber transmission line, and a chromatic dispersion slope with a sign opposite to that of the chromatic dispersion slope of said optical fiber transmission line; and a temperature controller that controls a temperature of said chromatic dispersion compensator in such a manner that the chromatic dispersion of said chromatic dispersion compensator is set at a desired value, wherein said chromatic dispersion compensator comprises one or more of dispersion compensating optical fibers, and wherein, at a predetermined wavelength, the absolute value of the chromatic dispersion fluctuation per unit temperature of said dispersion compensating optical fiber is 0.002 ps/nm/km/° C. or more, and the sign of the chromatic dispersion fluctuation per unit temperature of said dispersion compensating optical fiber is reversed to that of the chromatic dispersion fluctuation per unit temperature of said optical fiber transmission line.

3. A chromatic dispersion compensating module according to claim 1, further comprising a chromatic dispersion controlling unit which controls a temperature control operation of said temperature controller to set the chromatic dispersion of said chromatic dispersion compensator at a desired value.

4. A chromatic dispersion compensating module according to claim 1, further comprising:

a chromatic dispersion measuring unit which measures a cumulative chromatic dispersion in said optical fiber transmission line or a change of the cumulative chromatic dispersion in said optical fiber transmission line by monitoring input light incident to said chromatic dispersion compensator; and a chromatic dispersion controlling unit which controls a temperature control operation of said temperature controller in such a manner that the chromatic dispersion of said chromatic dispersion compensator is set at a desired value on the basis of the measured results of said chromatic dispersion measuring unit.

5. A chromatic dispersion compensating module according to claim 1, further comprising:

a chromatic dispersion measuring unit which measures a cumulative chromatic dispersion in said optical fiber transmission line or a change of the cumulative chromatic dispersion in said optical fiber transmission line by monitoring output light emitted from the chromatic dispersion compensator; and a chromatic dispersion controlling unit which controls a temperature control operation of said temperature controller in such a manner that the chromatic dispersion of said chromatic dispersion compensator is set at a desired value on the basis of the measured results of said chromatic dispersion measuring unit.

6. A chromatic dispersion compensating module according to claim 1, further comprising:

a temperature measuring unit which monitors a temperature of said chromatic dispersion compensator to predict a cumulative chromatic dispersion in said optical fiber transmission line or a change of the cumulative chromatic dispersion in said optical fiber transmission line; and a chromatic dispersion controlling unit which controls a temperature control operation of said temperature controller in such a manner that the chromatic dispersion of said chromatic dispersion compensator is set at a desired value on the basis of the measured results of said temperature measuring unit.

7. An optical transmission system comprising a chromatic dispersion compensating module according to claim 1.

8. An optical transmission system comprising a chromatic dispersion compensating module according to claim 4, which is provided between a light emitting end of said optical fiber transmission line and a receiver.

9. An optical transmission system comprising a chromatic dispersion compensating module according to claim 5, which is provided between a light emitting end of said optical fiber transmission line and a receiver.

10. An optical transmission system comprising a chromatic dispersion compensating module according to claim 6, which is provided between a light emitting end of said optical fiber transmission line and a receiver.

11. A chromatic dispersion compensating module according to claim 2, further comprising a chromatic dispersion controlling unit which controls a temperature control operation of said temperature controller to set the chromatic dispersion of said chromatic dispersion compensator at a desired value.

12. A chromatic dispersion compensating module according to claim 4, further comprising:

a chromatic dispersion measuring unit which measures a cumulative chromatic dispersion in said optical fiber transmission line or a change of the cumulative chromatic dispersion in said optical fiber transmission line by monitoring input light incident to said chromatic dispersion compensator; and a chromatic dispersion controlling unit which controls a temperature control operation of said temperature controller in such a manner that the chromatic dispersion of said chromatic dispersion compensator is set at a desired value on the basis of the measured results of said chromatic dispersion measuring unit.

13. A chromatic dispersion compensating module according to claim 4, further comprising:

a chromatic dispersion measuring unit which measures a cumulative chromatic dispersion in said optical fiber transmission line or a change of the cumulative chromatic dispersion in said optical fiber transmission line by monitoring output light emitted from the chromatic dispersion compensator; and a chromatic dispersion controlling unit which controls a temperature control operation of said temperature controller in such a manner that the chromatic dispersion of said chromatic dispersion compensator is set at a desired value on the basis of the measured results of said chromatic dispersion measuring unit.

14. A chromatic dispersion compensating module according to claim 4, further comprising:

a temperature measuring unit which monitors a temperature of said chromatic dispersion compensator to predict a cumulative chromatic dispersion in said optical fiber transmission line or a change of the cumulative chromatic dispersion in said optical fiber transmission line; and a chromatic dispersion controlling unit which controls a temperature control operation of said temperature controller in such a manner that the chromatic dispersion of said chromatic dispersion compensator is set at a desired value on the basis of the measured results of said temperature measuring unit.

15. An optical transmission system comprising a chromatic dispersion compensating module according to claim 2.

16. An optical transmission system comprising a chromatic dispersion compensating module according to claim 12, which is provided between a light emitting end of said optical fiber transmission line and a receiver.

17. An optical transmission system comprising a chromatic dispersion compensating module according to claim 13, which is provided between a light emitting end of said optical fiber transmission line and a receiver.

18. An optical transmission system comprising a chromatic dispersion compensating module according to claim 14, which is provided between a light emitting end of said optical fiber transmission line and a receiver.

* * * * *